Figure 1:
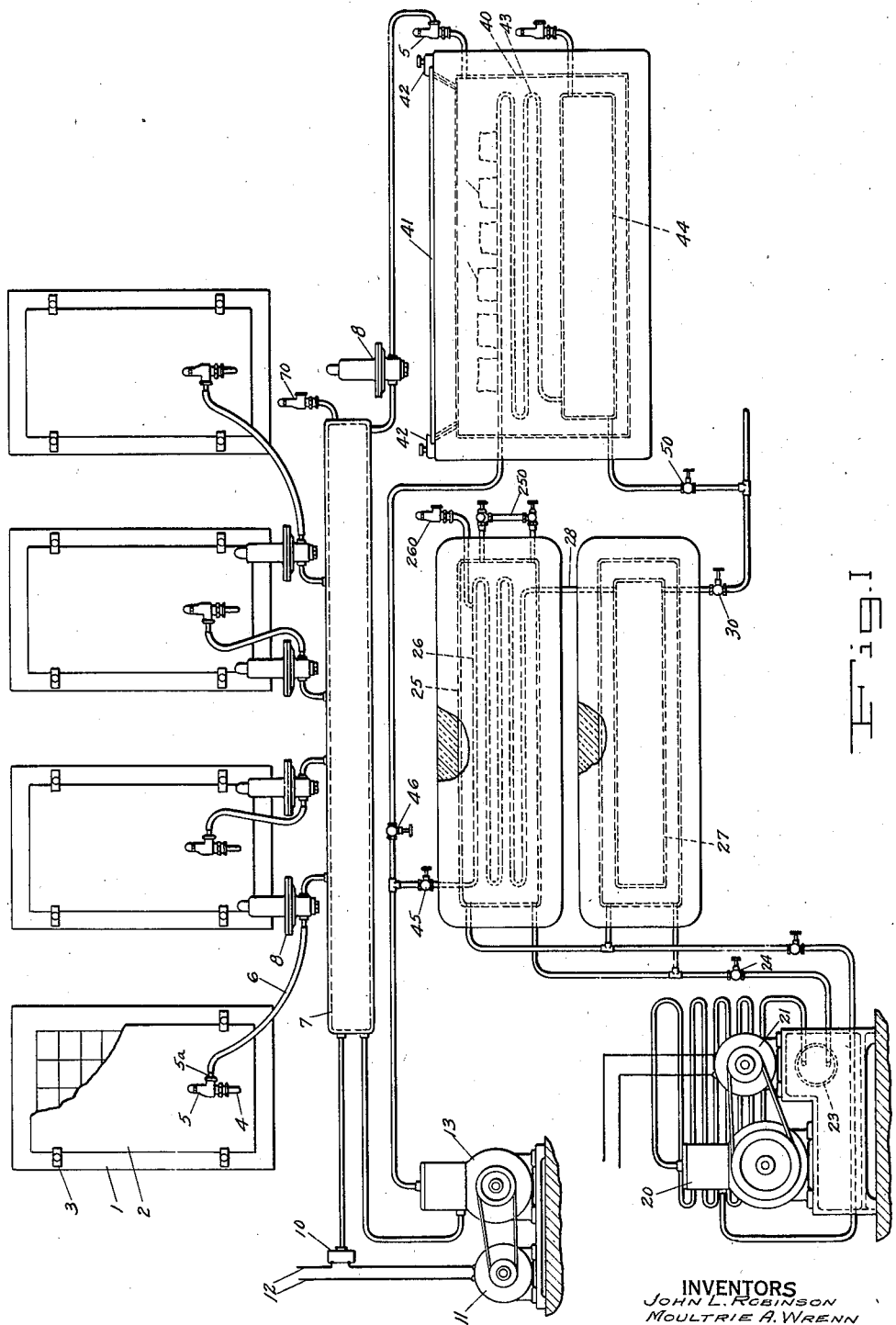

July 21, 1942.   J. L. ROBINSON ET AL   2,290,711
CO₂ RECOVERY APPARATUS
Filed March 13, 1940   2 Sheets-Sheet 1

INVENTORS
JOHN L. ROBINSON
MOULTRIE A. WRENN
BY G. F. McDougall
ATTORNEY

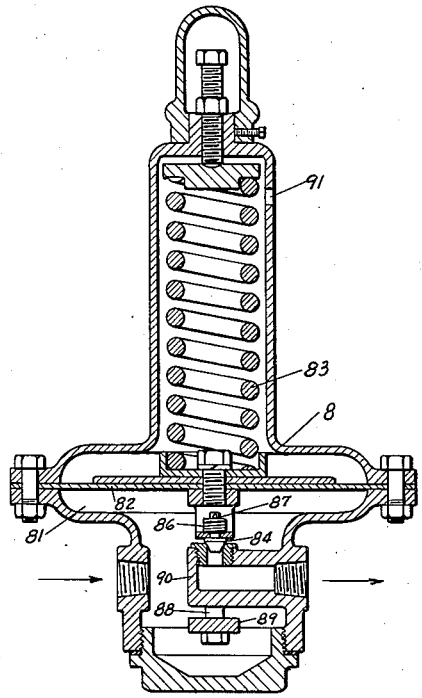
Fig. II
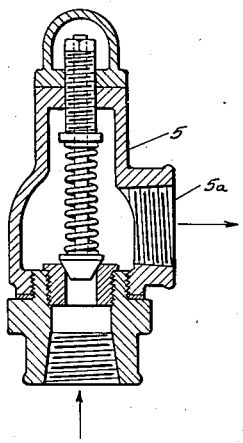
Fig. III

Patented July 21, 1942

2,290,711

UNITED STATES PATENT OFFICE 2,290,711

CO₂ RECOVERY APPARATUS

John L. Robinson and Moultrie A. Wrenn, Portland, Oreg., assignors to Carbon Dioxide Recovery Corporation, Portland, Oreg., a corporation of Oregon Application March 13, 1940, Serial No. 323,753

5 Claims. (Cl. 62—91.5)

This invention relates to dry ice storage with recovery of sublimated gas therefrom. The sublimation of dry ice is a continuous process from the instant the dry ice is made until it entirely disappears as gas.

Dry ice has an important field in the refrigeration art, there being certain conditions under which its superiority gives it exclusiveness notwithstanding its considerable cost. An important item contributing to the cost of dry ice has heretofore been the loss of the $CO_2$ gas of sublimation, heretofore regarded as inevitable without salvage possibility owing to the peculiar characteristics of dry ice, which will be hereinafter referred to.

It is an object of the present invention to provide for salvage and recovery of sublimated $CO_2$ gas by a method and apparatus that is economical and safe, physically in that there is less hazard than before from rapidly generated gas, and economically since the sublimation rate is reduced and more ice remains for sale from a given amount held in storage for a given time.

The foregoing and supplementary objects that will appear from the specification and claims, constitute the purpose of the present invention, the scope of which is pointed out in the claims attached hereto.

Dry ice, the common name for frozen $CO_2$ gas, has no intermediate liquid stage, but sublimates directly into gas because the boiling point of liquefied $CO_2$ is much lower than its freezing point, —109° F. as against —69° F.

The common method of making dry ice is to expand liquid through a small orifice, the liquid being first cooled to a low temperature which results in congelation of around 60% by weight of the $CO_2$ liquid into the characteristic "popcorn snow" by a constant total heat process as in the case of any expansion, which is at once compressed into blocks, the dry ice of commerce.

There will always be some entrained liquid varying in amount from a minimum, if the schedule of transposition is optimum, and increasing as the conditions vary from the best known.

If the block of dry ice contains an excess amount of liquid $CO_2$, it is very unstable, sometimes disintegrating with a violence that may be likened to an explosion. At best it is a tricky commodity to handle, best stored under a pressure of the order of five pounds pressure above atmosphere where the waste is less under optimum insulation against heat. Short storage is practicable at atmosphere pressure and definitely hazardous at below atmosphere pressures, the sublimation rate increasing somewhat as the square of the vacuumatic condition. It is ordinarily shipped in open top boxes, the structural feature of which is about nine inches of sheet cork in all walls with a heavy insulating blanket filling the open top of the box, over the contained dry ice.

We have recognized that if the valuable gas of sublimation could be recovered without adding to the hazard of storing the dry ice, a substantial saving would be at once achieved. We are not aware that this has been tried commercially because of the inherent danger, which is not only that of substantial loss due to shattering and rapid sublimation, but also danger of wrecking the valuable insulated storage apparatus.

We have now developed an apparatus having a workable operation cycle that solves the problem of gas recovery and liquefaction with the utmost safety. The novel features of the apparatus, its mode and principle of operation and the best way to arrive at the optimum result is fully disclosed in this specification.

Dry ice factories are always located where $CO_2$ gas or the raw materials for making it coincide with an available power supply, which involves transportation of the product to points where it is used. The shipments will be in bulk and the use in retail or wholesale quantities, which involves adequate storage at a distribution point.

Shipment in the open top boxes described supra, is not only the least hazardous but also develops a valuable test since dry ice shipped in that manner is always at atmosphere pressure for some time and if it does not shatter or explode while undergoing transportation at atmosphere, it can be relied upon that it will not afterwards do either of these things under a plus pressure of the order of five pounds. To take advantage of the things heretofore mentioned, we provide apparatus of which a schematic diagram is disclosed according to the drawings, which accompany and form a part of this specification as follows:

Fig. I is a diagrammatic layout of a plant sufficient to carry out the objects of the invention up to the point of liquefaction of recovered gas;

Fig. II is a sectioned view of the very special vacuum preventer valve interposed in the conduit between the ice storage and the liquefaction devices; and Fig. III is a vertical section of the pressure relief valve used on each of the dry ice storage receptacles, principally as a double check against vacuum in the stored ice receptacles and otherwise so that the receptacles can be shipped under a low controlled above atmosphere pressure if desired.

In the drawings, the numeral 1 represents a dry ice storage receptacle, adequately insulated and either of sufficient structural strength to resist the internal pressure necessary or that will be supplied with external reinforcement. There may be any desired number of these receptacles; in this case four are shown.

Each receptacle is provided with a door 2 and means such as clamps 3 for hermetically sealing the door into a registering opening in the receptacle 1.

A conduit 4 is in communication with the interior of each receptacle 1 and is provided with a pressure relief valve 5 of the general type shown in section in Fig. III, the purpose of which is to hold a desirable pressure above atmosphere in the receptacle with which it is associated, preferably of the order of 5 pounds gauge.

Since a valve of this type does not open and close at the same pressure, there will be a pound or two of pressure range and the pressure in the receptacle is not critical anyway, so long as it is maintained somewhat above atmosphere.

Attached to the discharge outlet 5a of the relief valve 5, is a conduit 6 which in part forms communication means to a collector tank 7, to which the gas delivered through the relief valve 5 is conducted. There will be one of these conduits for each receptacle as shown.

Interposed in the conduit is a diaphragm type one way valve 8, which acts as a sentinel to prevent vacuumatic influence from reaching the inside of the receptacle where the dry ice is stored. This or some other equally effective device is regarded as absolutely necessary. The gas enters as shown by the arrow at the left in Fig. II and builds up a pressure in the receiving chamber portion 81, the upper portion of which is the diaphragm 82, tending eventually to overcome the spring 83, lifting the diaphragm 82 and with it the valve 84 through which accumulated gas under pressure escapes towards the collector tank 7.

It will be noted that by use of the diaphragm type valve the spring 83 may be of much greater strength than would be possible with the pressure ranges contemplated, which is assurance that nothing less than hard scale, not expected in this situation, can prevent the valve 84 from seating. Accurate seating is improved by the spring 86 on the valve stem 84a and the loose mounting 87, the alignment being assured by the guides 88 of which there are two, connected by the plates 89. There are bored bosses, not shown, on both sides of the valve seat tube 90 through which the guides 88 pass.

It will be seen at once that vacuum in the collector can have no effect on structures beyond the valve 84, without breakdown, and should the diaphragm break, as they sometimes do, the spring will put the whole structure out of business until the valve is restored. Meanwhile, if the diaphragm breaks, the receptacle will be protected by provision for the gas going through the diaphragm to escape, as indicated by the orifice 91, to atmosphere.

Gas received in the collector tank accumulates until there is sufficient pressure therein to actuate the pressure actuated electrical switch 10, whereupon the motor 11 will be started by current received through the wires 12 from a source not shown. Preferably there is a small step down in pressure from the relief valve to the diaphragm valve and another small step down from the diaphragm valve to the pressure actuated electrical switch.

The motor 11 operates the gas compressor 13, which delivers compressed gas towards the liquefaction condensers more completely described hereinafter. The compressor 13 receives gas from the collector 7 that is very cold and of the density of about five pounds gauge. It is shown as a single stage compressor which can be made to operate very satisfactorily if of close clearance; but stage compression with intercooling is not intended to be excluded by this representation.

It will be understood that heavy insulation is intended for the conduits 6, the collector 7 and all parts that would otherwise absorb heat from atmosphere if exposed, though this has not been indicated in the interest of clarity of the drawings.

Two types of liquefaction cooling are shown. The first embodies a separate refrigerating plant consisting of the high pressure side of say an anhydrous ammonia plant, consisting of the ammonia compressor 20, driven by the motor 21 and delivering compressed ammonia gas to the atmospheric condenser to liquefaction by pressure and cooling to the liquid receiver 23; from whence it is conveyed through the expansion valve 24 and expands into the low pressure side consisting of a heat exchanger 25, the within coils 26 of which contain the $CO_2$ gas compressed by the compressor 13.

Below the coils 26 is a $CO_2$ liquid receiver 27, which receives liquid from the coils or equivalent through the pipe 28 and from whence it may be withdrawn for storage in the well known steel flasks. This process of withdrawal and storage with its pump, etc., is so well known that it will be considered as diagrammed by the withdrawal valve 30.

In operating a dry ice storage and distribution plant of the character indicated, there will always be some dry ice that is unsalable, due to too long storage of blocks, cutting of the blocks into marketable divisions and from occasional shattering which will be at a minimum with the plant we propose but always present in some amount. Hence we propose to utilize the valuable gas as follows.

We provide a dry ice storage receptacle 40 with a door 41 hermetically sealable as by the clamps 42. This receptacle contains a heat exchanger 43 which embodies support for rejected pieces of dry ice and a liquid $CO_2$ receiver 44.

To use this appliance, the gas delivered by the compressor 13 will be diverted in part to the heat exchanger 43 by means of the valve 45 and the valve 46, whereupon the rejected pieces of dry ice such as 47 will substitute for the ammonia refrigeration plant, complete, as shown at the left and hereinbefore described.

Liquid $CO_2$ in the liquid receiver 44 will be withdrawn through the valve 50 in the manner described for the valve 30.

It must be noted that the rejected dry ice receptacle 40 is equipped with a diaphragm valve 8 and a relief valve 5, both of which have been heretofore described and both of which function in exactly the same way as before described; hence when the gas of sublimation accumulates in the dry ice receptacle 40, it may be recovered as from the other storage receptacles. To prevent damage occurring from high pressure in case of shut down, we provide a safety valve 70 on the collector 7 and a safety valve 260 on the heat exchanger 26. The gage glass 250 indicates that we propose to operate the low pressure side of the refrigerating machine "flooded," that is, with a liquid to metal contact in the interest of efficient heat exchange.

The apparatus for utilizing otherwise waste dry ice for cooling in the liquefaction cycle is intended as supplementary to the separate refrigeration apparatus, resulting in important economy since the gas is already purified and advantage is taken of its low temperature to assist in its own conversion into liquid.

Having fully disclosed our apparatus and the accompanying method of saving gas sublimated by dry ice, explained its principle and indicated apparatus for carrying out the invention in its best form as we now know it, what we claim as new and desire to secure by Letters Patent is:

1. Apparatus for recovery of the gas of sublimation generated by dry ice in storage, comprising a hermetically sealed container for dry ice storage, means limiting self-generated gas pressure therein at a predetermined range of pressures above atmosphere, conduit means for withdrawing surplus gas from said container and diaphragm controlled valve means in said conduit for positively protecting the container from vacuumatic influence exerted by said withdrawing means, and means for compressing the withdrawn gas and condensing the same to a liquid state.

2. Apparatus as claimed in claim 1 in which the condensing means is cooled by dry ice, sublimating at a predetermined self-generated pressure above atmosphere, means for maintaining the pressure and means for withdrawing surplus gas from the condenser for compression and liquefaction which includes means for positively protecting the dry ice in the condenser from vacuum effect generated by the withdrawing means.

3. Apparatus for recovery and liquefaction of $CO_2$ gas sublimated from dry ice held in storage, comprising a hermetically sealed dry ice receptacle, valve means for limiting pressure within said receptacle to optimum plus pressure above atmosphere, conduit means cooperative with said valve means for conveying gas discharged therefrom to a collector, a compressor operatively connected to said collector and a liquefying condenser cooperatively attached to said compressor, characterized by valve means interposed in said conduit means between the receptacle and the collector effective to prevent vacuumatic influence generated by the compressor from affecting the interior of the receptacle.

4. In apparatus of the character described, a dry ice storage, valve means for maintaining pressure therein at predetermined above-atmosphere pressure, a gas collector, a conduit between said valve means and said collector and a gas liquefying means adapted to draw gas from the collector and liquefy the same, characterized by means interposed in said conduit effective to protect dry ice within the dry ice storage from vacuum influence developed by said gas liquefying means.

5. Recovery apparatus for utilizing unsalable pieces of dry ice, comprising a hermetically sealable storage receptacle for the ice, a condenser within the receptacle, a liquid receiver in said receptacle that is operatively connected to a gas compressor, whereby sublimed gas from the ice in storage may be compressed, a delivery conduit from the compressor to the condenser and valve means interposed in the first named conduit that are effective to maintain above atmosphere pressure in the receptacle while the combination is operating.

JOHN L. ROBINSON.
MOULTRIE A. WRENN.